United States Patent [19]
DeYoung

[11] Patent Number: 5,181,796
[45] Date of Patent: Jan. 26, 1993

[54] METHOD FOR IN SITU CONTAMINANT EXTRACTION FROM SOIL

[76] Inventor: Scott H. DeYoung, 51 Caudatowa Dr., Ridgefield, Conn. 06877

[21] Appl. No.: 728,610

[22] Filed: Jul. 11, 1991

[51] Int. Cl.⁵ .............................................. E02D 3/11
[52] U.S. Cl. .................................... 405/128; 405/131
[58] Field of Search ............................ 405/128–131; 166/266, 272, 370

[56] References Cited

U.S. PATENT DOCUMENTS

| | | | |
|---|---|---|---|
| 4,846,134 | 7/1989 | Perry et al. | 123/520 |
| 4,895,085 | 1/1990 | Chips | 405/129 X |
| 4,982,788 | 1/1991 | Donnelly | 166/266 |
| 5,011,329 | 4/1991 | Nelson et al. | 405/128 |
| 5,022,787 | 6/1991 | Kuragaski et al. | 405/128 |

FOREIGN PATENT DOCUMENTS

| | | | |
|---|---|---|---|
| 744070 | 6/1980 | U.S.S.R. | 405/131 |
| 863759 | 9/1981 | U.S.S.R. | 405/131 |
| 876837 | 10/1981 | U.S.S.R. | 405/131 |
| 1211392 | 2/1988 | U.S.S.R. | 405/131 |

*Primary Examiner*—Randolph A. Reese
*Assistant Examiner*—John Ricci

[57] ABSTRACT

Disclosed is a method and apparatus for the in situ removal of contaminants from contaminated soil wherein exhaust gas from an internal combustion engine is injected at an elevated temperature into contaminated soil creating a sweep gas driving volatile organic chemicals out of the in situ soil. The mechanical energy from the internal combustion engine is utilized in separating the volatile organic chemicals from the sweep gas and/or increasing the flow rate of the sweep gas through the contaminated soil by either increasing the injection pressure and/or reducing the pressure on the recovery well.

20 Claims, 3 Drawing Sheets

THERMALLY ENHANCED SOIL VENTING
V.O.C. MITIGATION/RECOVERY PROCESS

THERMALLY ENHANCED SOIL VENTING
V.O.C. MITIGATION / RECOVERY PROCESS

V.O.C. RECOVERY SYSTEM

METHOD FOR IN SITU CONTAMINANT EXTRACTION FROM SOIL

BACKGROUND OF THE INVENTION

1. Field of the Invention

This invention relates to remediation of contaminated soil and water and, more particularly, this invention relates to treatment of soil contaminated with volatile organic compounds such as gasoline by thermally enhanced soil venting and contaminant recovery. The invention also relates to utilizing the mechanical and thermal energy produced by an internal combustion engine to operate the remediation system.

2. Detailed Background

Public officials are becoming aware of the nature and extent of the problem of contamination of the water supply and soil from storage tanks leaking various chemicals into the soil. EPA estimates in the United States place the volume of liquid hazardous waste stored at 20 billion gallons annually These materials are stored at about 4,000 locations. It is also estimated that there are over $\frac{3}{4}$ of a million individual motor fuel tanks and over 300,000 gas stations and trucking companies with gasoline storage tanks. As many as $\frac{1}{3}$ of the petroleum tanks may be leaking. Over half are estimated to leak at a rate in an excess of 6 gallons per day. This roughly translates into 1.3 million gallons of fuel daily that is lost into the subsurface.

Soil excavation has been the traditional method for decontaminating a site with absorbed hydrocarbon contamination. It is often difficult to assess the full extent of the contamination. Besides being costly, excavating the soil merely changes the location of the contaminated soil. Hazardous waste disposal sites are becoming fewer and fewer and the expense and the regulation concerned with transporting the hazardous waste from the sites to the storage site makes this an unattractive method of disposal. Current laws make the owner of the waste responsible forever for the stored waste whether it is the contaminated dirt or the spent carbon adsorbent.

Soil ventilation is a cost effective way to decontaminate soil. This is effective in locations where the contamination has not reached groundwater. Currently there are two general methods used for remediation of groundwater before it can be discharged into a reinfiltration gallery, sewer or storm drain. These are carbon filtration or air stripping. Carbon filtration is not desirable on highly contaminated sites as the cost of carbon and its associated handling and disposal costs become prohibitive. With air stripping, the cost of carbon is eliminated leaving only replacement costs of packing as the major maintenance expense However, in areas where emissions are controlled, carbon canisters for air polishing are required. When the soil is highly contaminated with hydrocarbon, the associated cost of carbon again becomes prohibitive.

One proposal for the elimination of gasoline vapors is to burn the recovered vapors. See, for example, U.S. Pat. No. 4,846,134, the disclosure of which is incorporated herein by reference. The level of hydrocarbons recovered in the vapor stream is usually not sufficient to maintain combustion by these vapors alone. Either additional fuel must be added to the vapor to sustain combustion or catalyst must be used to maintain combustion.

The in situ treatment of contaminated soil has been carried out by use of neutralizing chemicals and solvents, as well as nutrients and microorganisms to promote in situ biodegradation of the contaminants. In addition, in situ soil flushing has been carried out by injecting solvents or surfactants into the soil to enhance the contaminant solubility. This technique involves the drilling of an extraction well in the contaminated soil zone, the drilling of reinjection wells upgradient of the contaminant area, and the construction of a waste water treatment system Subsequent to the soil treatment, the groundwater is reinjected upgradient of the extraction well, which then leaches through the contaminated soil. The leachate is then collected, treated and reinjected back into the system, creating a closed loop system.

Yet another in situ treatment of contaminated soil involves a process in which production wells are drilled through the contaminated soil zone to a depth just above the water table. Monitoring wells are drilled around the production wells to monitor pressure gradients. A vacuum is then applied to the production wells. Because of the horizontal pressure gradient created in the soil zone by the vacuum pumps, volatiles in the soil percolate and diffuse through the air spaces between the soil particles to the production well. The vacuum established in the soil continuously draws volatile organic compounds and contaminated air from the soil pores, and draws free air through the soil surface down into the soil. The volatiles removed from the monitoring wells are then processed through a liquid-vapor separator. This procedure applies no heat input and is limited in both the rate of contaminant removal and the types of contaminants which can be vaporized.

In another variation of the foregoing technique, the treatment system includes injection wells for injecting steam, hot air and liquid chemicals into the churned soil. Extraction wells operating in a partial vacuum environment provide a horizontal pressure gradient in the soil. The mixture heats the soil and raises the temperature of the chemicals, eventually causing them to evaporate. The evaporated chemicals are drawn horizontally to the extraction wells and piped to a processing system that cools the chemical vapors for conversion into a liquid. The liquid chemicals are then further processed.

In U.S. Pat. No. 4,670,634 the disclosure of which is incorporated herein by reference, there is disclosed a technique for decontaminating soil by the use of radio frequency energy to heat the soil. Electrodes located over the surface of the decontaminated area radiate rf energy into the soil and heat the soil to the extent that gases and vapors are produced. The rising gases and vapors are collected by a vapor barrier which operates under a slight vacuum. While the system appears to be effective, the energy requirements are substantial and costly, and the depth of the heat penetration into the soil is limited.

While the foregoing techniques are somewhat effective in providing in situ decontamination of the soil, many of the shortcomings attendant with such techniques are that the processes incur high operating expenses, require expensive equipment or chemicals, and as a final result are not overall extremely effective in reducing contaminants to a very low level.

From the foregoing, it can be seen that a need exists for a technique for the improved in situ removal of contaminants from a material. A further need exists for an efficient method and apparatus for the in situ decontamination of soil to a very low level, and which reduces the possibility of releasing or expelling such contaminants into the air. Another need exists for apparatus for controlling the injection of a heated gas into contaminated soil. Yet another need exists for an efficient utilization of energy, in heating the injection gas to raise the temperature of the contaminated soil so that volatile and less volatile contaminants can be vaporized.

The Environmental Protection Agency has sponsored tests of in situ contaminant removal by steam injection and also injection of steam air mixtures. The heat provided by either of these methods enhances the vapor concentration of the volatile compounds and thereby aids in their removal of contaminated soil.

Biodegradation of hydrocarbons is disclosed in U.S. Pat. No. 4,765,902, the disclosure in which is incorporated herein by reference The data indicates for some sites that more than half of the contaminant can be removed by evaporation, but the evaporated material may need processing to prevent release to the air. This un-degraded material can present a processing problem or an air contamination problem.

SUMMARY OF THE INVENTION

Disclosed is apparatus for and a method for the in situ removal of volatile contaminants from contaminated soil comprising the steps of:

injecting hot exhaust gas from an internal combustion engine into and through said contaminated soil thereby volatilizing a portion of said volatile contaminants and removing a volatile organic chemical containing gas from said soil while said soil remains in situ.

Preferably the mechanical energy from the internal combustion engine is utilized in separating the volatile organic chemicals from the sweep gas and/or increasing the flow rate of the sweep gas through the contaminated soil by either increasing the injection pressure and/or reducing the pressure on the recovery side of the process. Preferably injection and recovery wells are utilized.

DETAILED DESCRIPTION OF THE INVENTION

Figure 1:
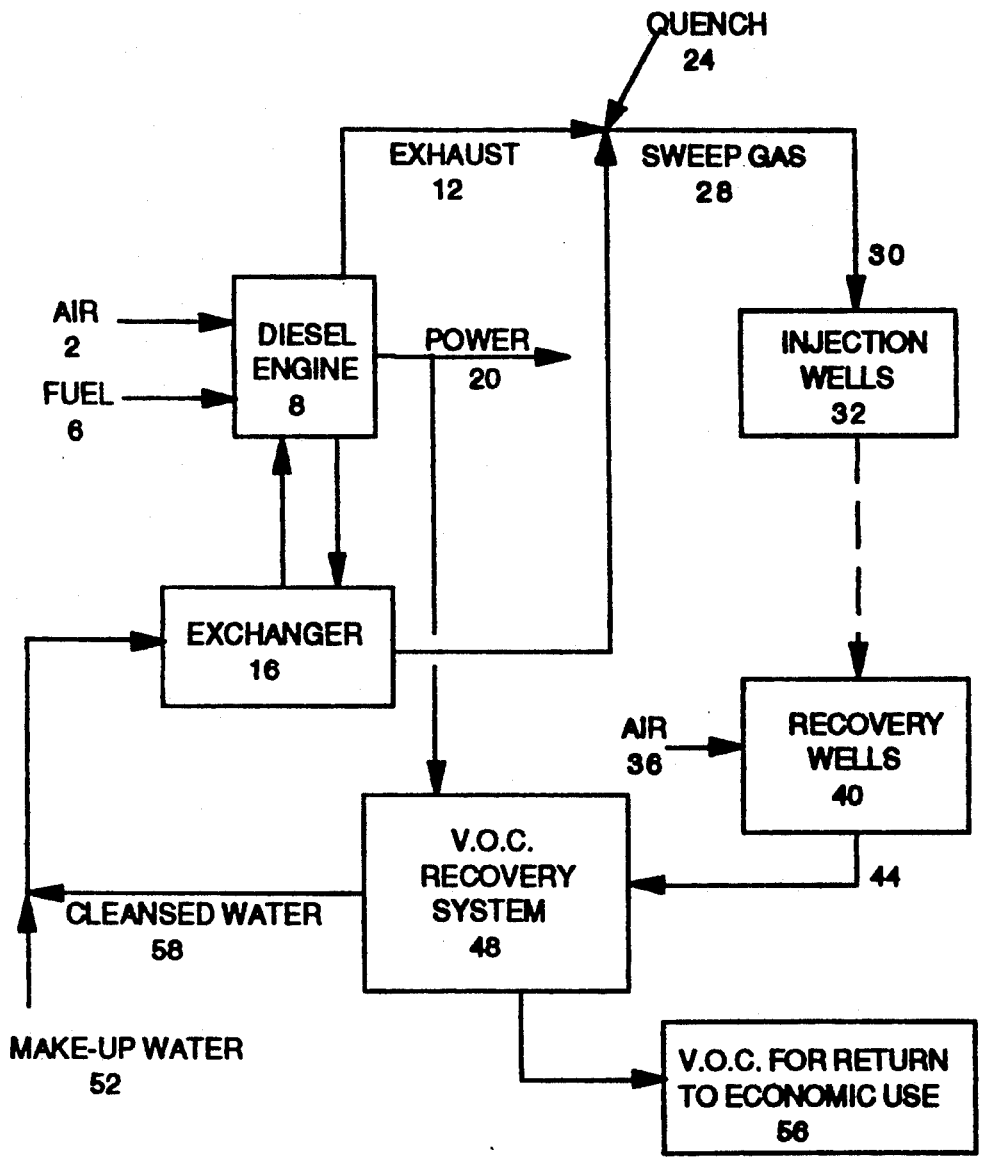
FIG. 1 is a schematic representation of a preferred embodiment of the process of the present invention for thermally enhanced soil venting of volatile organic chemical contaminants with recovery of the contaminants.
Figure 2:
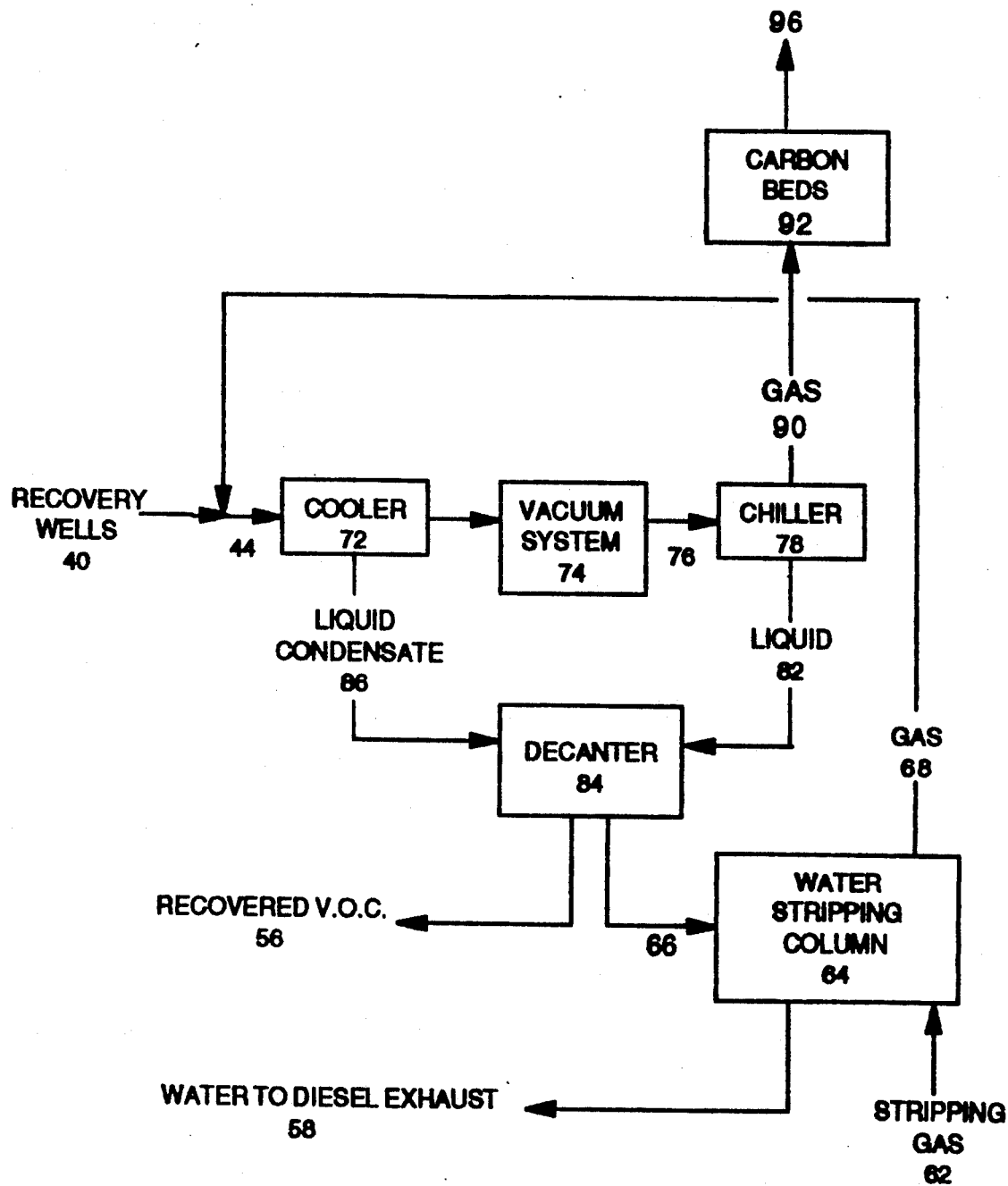
FIG. 2 is a schematic representation of a preferred volatile organic chemical (VOC) recovery system as it relates to FIG. 1. Power to operate the recovery system in FIG. 2 is provided at least in part by the engine shown in FIG. 1.
Figure 3:
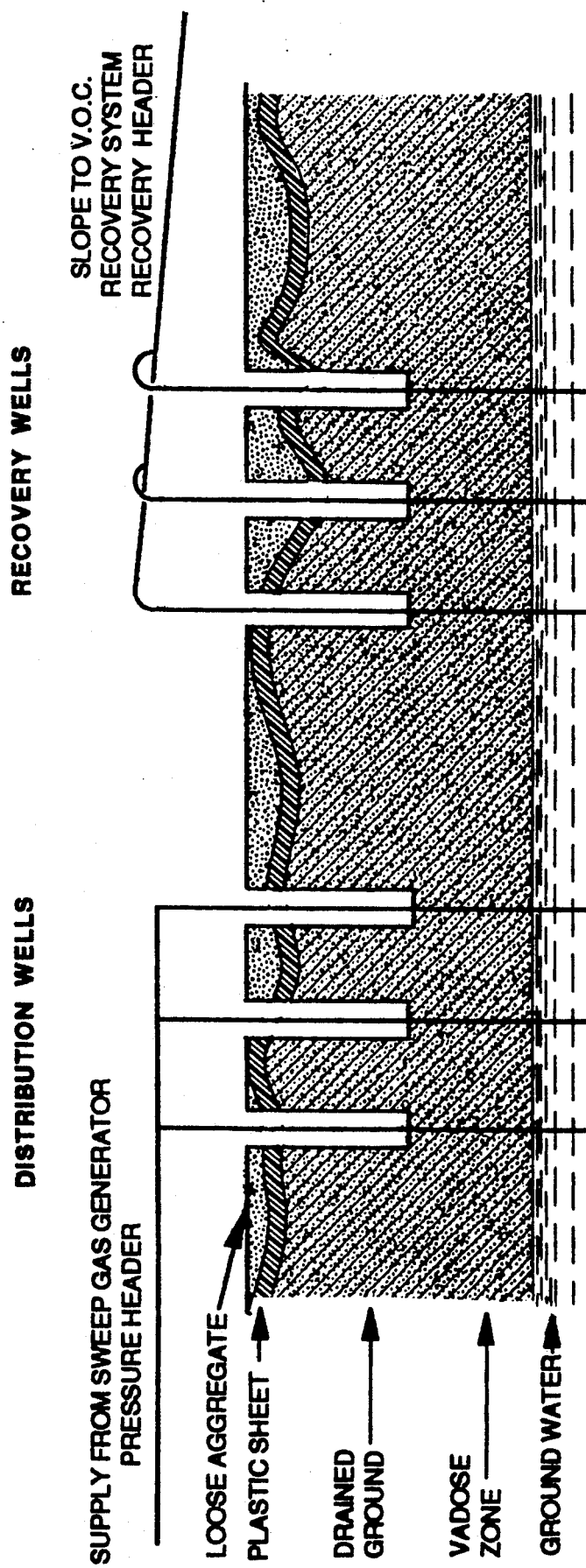
FIG. 3 is a well-field schematic of a preferred embodiment of the invention illustrating well-injection of exhaust engine gas, heat, and water into a contaminated field along with migration of contaminants in the field along with removal of the contaminants from the soil via a recovery well. Diesel engine exhaust and waste heat are utilized to produce a wet low pressure warm sweep gas for in situ injection into the contaminated soil. The wet warm sweep gas stripes volatile organic matter from the soil and transports it to recovery wells. The soil surface has a barrier seal to prevent pollution of the atmosphere and collect volatilized organic chemical contaminants.

The invention is best understood by reference to the preferred embodiment shown in FIGS. 1-3.

Referring to FIG. 1, air 2 and fuel 6 are combusted in a diesel engine 8. Hot exhaust 12 from the diesel engine 8 is quenched 24 with excess water 52, 58 to form a warm sweep gas 28 for injection into injection wells 32. The concentration of water in the sweep gas can vary widely but preferably the sweep gas is saturated with water. The exhaust 12 pressure is generally at a pressure suitable to force the sweep gas 28 through a distribution pipe 30 and into injection wells 32. A Cummins 340 horsepower diesel engine can operate at 1.47 psi. discharge pressure and drive a generator (not shown) at 244 KW producing mechanical power 20.

The sweep gas temperature can vary widely but will generally be injected into the contaminated soil at a temperature in the range of 50° to 212 ° F., preferably 100° to 200 ° F. and most preferably 140° to 170 ° F.

The sweep gas injection pressure can vary widely but will generally be in the range of 0.1 to 20 psig, preferably 0.1 to 5 psig, and most preferably 0.5 to 2.0 psig. Mechanical energy from the internal combustion engine can of course be utilized to increase the sweep gas injection pressure or to draw a vacuum if for example a recovery well is utilized and it is necessary to increase the flow of sweep gas through the soil The most desirable conditions of injection temperature, pressure and extraction can readily be determined empirically in the field.

Again referring to FIG. 1 the diesel engine 8 has a water cooled heat exchanger 16 for recovery of engine heat and preheating quench water 52, 58. Volatile organic chemicals in the contaminated soil are vaporized by the sweep gas 28 and recovered in recovery wells 40. Excess air 36 is withdrawn with the vaporized volatile organic chemicals 44 at the recovery wells. The volatile organic chemical recovery system 48. Power 20 to operate the volatile organic chemical recovery system 48 is provided by the diesel engine 8. The volatile organic chemical recovery system 48 is shown in more detail in FIG. 2. The volatile organic chemical recovery system 48 recovers organic compounds 56 as liquids for return to economic use and cleansed water 58 for quenching of the diesel exhaust 12.

FIG. 2 shows details of the volatile organic chemical recovery system which was shown as block 48 in FIG. 1. Volatile organic chemicals and sweep gas 44 are drawn from recovery wells 40 through a cooler 72 by vacuum system 74. The cooler 72 may be air cooled, refrigerated or cooled otherwise The cooler 72 cools the volatile organic chemicals containing sweep gas and contained water vapor 44 to partially remove the condensable components 86 as liquid. The vacuum system 74 provides the driving energy to move vapors 44 into the recovery system 48.

The discharge 76 from the vacuum system flows into a chiller 78 where the temperature is reduced more to condense more liquid 82. Liquids 82 are water, and condensable volatile organic chemicals which depending on the volatile organic chemicals maybe in separate liquid phases or partially dissolved in the condensate water. The recovered volatile organic chemicals 56 are periodically withdrawn for processing elsewhere. Water 66 from decanter 84 is withdrawn as a separate phrase and stripped of remainder volatile organic chemical 68. The stripped volatile organic chemicals 68 are recycled to the beginning of the recovery process at 44.

The stripping column 64 may be driven by a small stream of stripping gas 62 or alternately it can be operated under vacuum by vacuum pump to remove bulk volatile organic chemicals from the decanted water 66.

Noncondensibles 90 are exhausted from the chiller 78 at a temperature above the temperature where freezing would interfere with the chiller operation. Exhaust 90 from the chiller 78 is further processed by carbon beds 92 adsorbtion before discharge to the atmosphere 96.

The carbon beds 92 are periodically regenerated to remove volatile organic chemicals. Regeneration is not shown in FIG. 2 but is accomplished by thermally stripping with gas 12 provided by the diesel engine 8 by or applying mechanical vacuum with power 20 provided by the diesel engine 8.

The volatile organic chemical contaminants will vary greatly but generally have boiling points in the range of 40° to 500° F. Generally the contaminated soil is contaminated with one or more vapor-producing substances including but not limited to gasoline, diesel fuel, kerosene, benzene, toluene, xylene, petroleum distillates, hydrocarbons; alcohols including but not limited to methanol, ethanol, isopropanol; halogenated hydrocarbons and halocarbons including but not limited to methylene chloride, trichloroethylene, trichloroethane, perchloroethylene, perchloroethane, chloroform, carbon tetrachloride, dichloroethylene, dichloroethane, chloroethylene, chloroethane; Freons including but not limited to Freon 112 and Freon TF; ethers including but not limited to diethyl ether and chlorinated ethers; ketones including acetone, methylethyl ketone, methyl isobutyl ketone; paraffinic hydrocarbons including but not limited to methane, ethane, propane, butane, pentane, hexane; cyclocompounds; unsaturated hydrocarbons including but not limited to ethylene, propylene, acetylene, methyl acetylene, allene; nitrohydrocarbons including but not limited to nitromethane, nitropropane, nitrobutane, nitrobenzene; hydrazines including but not limited to hydrazine, hydrazine hydrate, methyl hydrazine, unsymmetrical dimethyl hydrazine, symmetrical dimethyl hydrazine, ethyl hydrazine; aldehydes including but not limited to methanal, ethanal, propanal and acrolein.

A wide range of well-field configurations can be utilized. Separation of volatile organic chemicals from contaminated soil into a separately transportable vapor phase is one objective of this invention. Conventionally developed well fields (oil, gas, water) are usually intended to operate over many years. The present invention focuses on minimizing energy requirements and maximizing recovery efficiently. This is accomplished by usefully applying heat which otherwise might be wasted. Control of the flow of sweep gas is site specific and will normally be directed by a skilled geotechnologist or related professional.

Depending on the nature of the contamination at a site most sweep gas will be directed into the vadoze zone or into the upper surface of the water table. Similarly, recovery gas will be produced from near the vadoze zone.

A sufficient number of injection wells will be drilled to accept all of the exhaust from a diesel engine without excessive back pressure on the engine. Similarly recovery wells will be drilled in a suitable pattern to control the flow of sweep and excess air as desired for the clean up.

Frequently, well casings are cemented into place but for the preferred embodiment of the present invention, it is expected that inflated concentric tubes will serve as "packers" and seals. Deflation of these tubes will make well pipe recovery possible in contrast to cemented casing.

The relatively low temperatures of the injection in recovery gas will allow handlers to be designed with plastic pipe and possibly clamped rubber sleeved seals.

Control of sweep gas 44 at the surface is important for safety and to minimize air pollution. At the low pressures envisioned for operation, simple plastic sheeting with loose aggregate can form a suitable seal. Similarly plastic sheeting with small dams could be flooded for the clean up.

Comparison With Other Insitu Technologies and Other Embodiment of the Invention

The present invention and various embodiments is further understood by comparison with other technologies for the decontamination of soil and water:

A. U.S. Pat. No. 4,765,902 issued Aug. 23, 1988, the disclosure of which is incorporated herein by reference, reports data for insitu biodegradation and soil venting. For data reported in FIG. 5 of that patent approximately 65% of the gasoline recovered from site 2 was recovered by evaporation into the air stream pulled through the contaminated zone. The rest of the gasoline (about 35%) was biodegraded. With this and other recoveries by evaporation, surface processing is necessary to avoid transfer of ground water pollutant into an air pollutant. Carbon dioxide concentrations in the vent soil gas range from about 4½% to 7%. This corresponds to about 1 to 2% or less biodegraded gasoline vapor in the vent gas. The ground temperature, hydrocarbon vapor pressure and dilution limit the amount of gasoline vapor concentration achievable in the vapor phase. Increasing the temperature of the contaminated soil area will increase the concentration of evaporated volatile organic chemicals. Any increase in volatile organic chemicals transport will shorten the time required, reduce the energy required, and minimize the expense for cleanup.

U.S. Pat. No. 4,765,902 reports in example 1 operating vent wells for 2 years to control migration of oil vapors into nearby buildings. Two years is a long time to disrupt an area with cleanup activities. Furthermore, the overhead costs for supporting an operation with surveillance, governmental reporting, and disruption of normal site use tend to be more related to the length of time for a clean-up program than to the actual cost spent for direct clean-up activity.

O-Xylene (a xylene isomer) has a vapor pressure of 2.6 mm mercury at 10° C. (50° F.) and a vapor pressure of 25 mm mercury at 49° C. (120.2° F.). This represents an increase in vapor pressure of 9.6 times. Other volatile organic chemicals have similar increases in vapor pressure as will be obvious to one skilled in physical properties of volatile organic chemicals. The volatile organic chemicals carrying capacity of a gas greatly increased with temperature. However, any increase in carrying capacity with temperature results in thermal energy required to heat the surrounding ground Energy used to heat contaminated soil represents lost energy since the ground remains warm after the contaminated soil is removed. In the present invention heat from an engine which would otherwise be waste heat and is utilized it to increase the volatile organic chemical carrying capacity of the sweep gas.

Additionally U.S. Pat. No. 4,765,902 reports several methods of operation to avoid flammable and explosive vapor concentration problems. In the present invention oxygen concentrations are avoided which support combustion while at the same time increasing the volatile organic chemicals concentration for more economic recovery Increased concentrations of vapor translate directly into more economical recovery of the evaporated volatile organic chemicals and reduced energy for withdrawal of the vent gas. The energy for pressurizing the injection gas can be the same back pressure required to operate a heat recovery system in a co-generation system and therefore is recognized in the known efficiency for a diesel generator at about 34%. This energy efficiency is similar to that in central power plant generating units, but diesel fuel is somewhat more expensive.

An additional advantage of the present invention is that no outside utilities are required for its operation. Treated boiler feed water is not required, no electric power connections are required and all of the equipment can be mounted on a trailer bed except for the well-field gear.

B. The EPA has treated soil cleaning by steam cleaning as reported in Chemical and Engineering News; Dec. 12, 1988, pages 24–25 which is incorporated herein by reference This reference reports surprise at recovery of xylene by steam since xylenes boil at higher temperatures than water (steam). U.S. Pat. No. 5,009,266, which is herein incorporated by reference, relates similarly thereto.

In the present invention Table I shows a comparison of the invention and steam cleaning for a hypothetical soil contaminated with 3 pounds per cubic foot of O-Xylene (3% or 30,0000 ppm). The heating for this invention is provided by water quenching of a diesel exhaust to an adiabatic saturation temperature of about 160° F. As can be seen in Table I, limiting the temperature increase of the soil improves energy utilization substantially. Much energy is transported into the soil in the form of latent heat of condensation of water. Since the latent heat is great compared to the sensible heat, there is little or no excess heating of the soil.

Industrial boilers typically operate when well run at 80 to 95% thermal efficiency. Lost in the hot exhaust of a boiler is the potential energy of condensation of the water formed from combustion of fuel. All of this so called higher heating value is recovered in the present invention.

Table II shows an overall comparison of this invention with steam cleaning where the electric power of this invention is credited at 10,000 Btu/KWH (a figure widely used by the the Department of Energy to compare mechanical energy efficiency against thermal fuel energy used to generate electric power). As can be seen from the Table II comparison, the process of the present invention requires less energy than for steam cleaning processes. Additionally, steam boilers frequently require a licensed operator which would not be necessary in the present invention which avoids the use of a steam boiler and utilizes a warm sweep gas using the energy from an internal combustion engine.

TABLE I
COMPARISON OF OVERALL ENERGY BETWEEN THERMALLY ENHANCED SOIL VENTING (TESV) AND STEAM CLEANING

Basis: 230.25 ft3 of soil (= one hour operation at TESV conditions), assume same amount of electric process energy for steam cleaning as TESV, Assume DOE factor for power generation o 10,000 Btu/KWH, assume 80% boiler efficiency for steam generation.

| | THEORETICAL ENERGY BALANCE | |
|---|---|---|
| | TESV Process | Steam Cleaning |
| Thermal Input fuel | 2,460,000 | |
| Fuel for steam generation | | 1,317,600 Btu |
| Fuel for electric power gen. at 244 kwh | | 2,440,000 Btu |
| Total equivalent energy | 2,460,000 Btu | 3,757,600 Btu |

Ratio $\frac{2,460,000}{3,757,000} = 0.6547$ or $1 - 0.6547 = 34.5\%$ energy savingd with TESV

TABLE II
COMPARABLE ENERGY REQUIREMENTS BASED ON AREA
Basis: 1 acre (43,560 ft2),
depth 20 ft.,
same conditions as earlier Table.
Volume of material treated 871,200 ft3

| | PROCESS | |
|---|---|---|
| Cleaning | TESV Process | Steam |
| Time based on one 344 hp TESV unit | 3784 hours | unknown |
| Energy required as calculated Btu | 9308 MM Btu | 14,215 MM Btu |
| Energy cost @ $0.60/gal #2 | $40,000 | $60,000 |

C. Steam-air Treatment comparison: Treatment of contaminated soils has been tested with steam and air injection as reported in Chemical Engineering, Dec. 7, 1987, page 17, the entire article of which is incorporated herein by reference. Heated compressed air (250° F.) and steam (350°–400 ° F.) are forced down the shaft of a 5 foot diameter cutter blade which digs a hole in the soil. Steam and air contacts the contaminated soil around the cutter. The evaporated volatiles are collected in a hood at ground surface and recovered. The ground is heated to 180°-200° F.

The differences between this toxic treatments process and the present invention is that 1) engine combustion gas promotes safer operation by reduction of oxygen levels, 2) greater efficiency is achieved by this invention by greater thermal recovery than is possible with a boiler and separate air compressor and 3) the contaminated soil is much less disturbed by use of wells than totally disturbing the contaminated soil. When structures exist or are planned, soil disturbance may require costly foundation work. Alternately where suitable, the process of this invention can be adapted to soil "churning" equipment and the term "insitu" is used in the present invention to mean "on site" and includes situations where the soil has been excavated but not transported to a distant site.

D. Utilization of this invention with other insitu technologies—Normally where a soil is contaminated by a volatile organic chemicals an attempt is made to recover any free phased liquid floating on the water table.

This in some cases can remove large quantities of liquid. This invention can be applied simultaneously or subsequently with other methods for recovery.

Where drinking water sources are near contaminated soil, high levels of cleaning are required and various pump (liquid) and treat methods may also be required.

One advantage of the present invention is the relatively low pressure differences which can practically be applied. On the injection site, a low pressure supply will cause little water table depression and related contamination from any partially immobilized layer. This can similarly be true for recovery wells if low "suction" is desirable. Specific site considerations will be determined by one skilled in the art.

One structure of the present invention comprises means for removing contaminated vapor wherein exhaust gas passes upwardly through the soil and into a containment vessel and wherein the containment vessel comprises a flexible material positioned above the contaminated soil with the perimeter of the vessel in contact with the soil.

As will be evident to those skilled in the art, various modifications of this invention can be made or followed, in light of the foregoing disclosure and discussion, without departing from the spirit or scope of the disclosure or from the scope of the following claims.

What is claimed is:

1. A method for the in situ removal of volatile contaminants from contaminated soil comprising the steps of:
    injecting hot exhaust gas from an internal combustion engine into and through said contaminated soil thereby volatilizing a portion of said volatile contaminants and
    removing a volatile organic chemical containing gas from said soil while said soil remains in situ.

2. The method of claim 1 comprising the additional step of separating volatile organic chemicals from said volatile organic chemical containing gas.

3. The method of claim 2 wherein mechanical energy is generated by said engine and at least a portion of said mechanical energy is utilized to separate condensable volatile organic chemicals from said gas.

4. The method of claim 3 wherein said internal combustion engine is a diesel engine.

5. The method of claim 4 wherein at least a portion of said exhaust gas is quenched with water prior to injection into said contaminated soil thereby forming a water-containing sweep gas which is injected into said contaminated soil.

6. The method of claim 5 said injecting is through an injection well in said contaminated soil and said sweep gas passes through said contaminated soil and volatilizes and entrains a portion of said volatile organic chemicals which are withdrawn in a recovery well distant from said injection well.

7. The method of claim 6 wherein liquid water is utilized as a coolant for said internal combustion engine thereby forming heated water and at least a portion of said heated water is utilized to quench said exhaust gas.

8. The method of claim 6 wherein liquid water is separated from said volatile organic chemical containing gas and at least a portion of said water is utilized as a coolant for said internal combustion engine or utilized to quench said exhaust gas.

9. A method as in claim 8 further comprising the step of feeding a portion of said separated volatile organic chemicals as fuel to said internal combustion engine, thereby destroying said contaminants.

10. A method as in claim 9 wherein said injecting is at a temperature in the range of 100° to 200° F. and at a pressure in the range 0.1 to 5 psig.

11. A method as in claim 10 wherein said internal combustion engine is selected from the group of piston engines, aircraft engines, jet engines, turbine engines, rotary engines, wankel engines, diesel, propane, natural gas, and alcohol burning engines, two and four cycle engines.

12. A method as in claim 1 wherein said contaminated soil is contaminated with one or more vapor-producing substances including but not limited to gasoline, diesel fuel, kerosene, benzene, toluene, xylene, petroleum distillates, hydrocarbons; alcohols including but not limited to methanol, ethanol, isopropanol; halogenated hydrocarbons and halocarbons including but not limited to methylene chloride, trichloroethylene, trichloroethane, perchloroethylene, perchloroethane, chloroform, carbon tetrachloride, dichloroethylene, dichloroethane, chloroethylene, chloroethane; Freons including but not limited to Freon 112 and Freon TF; ethers including but not limited to diethyl ether and chlorinated ethers; ketones including acetone, methylethyl ketone, methyl isobutyl ketone; paraffinic hydrocarbons including but not limited to methane, ethane, propane, butane, pentane, hexane; cyclocompounds; unsaturated hydrocarbons including but not limited to ethylene, propylene, acetylene, methyl acetylene, allene; nitrohydrocarbons including but not limited to nitromethane, nitropropane, nitrobutane, nitrobenzene; hydrazines including but not limited to hydrazine, hydrazine hydrate, methyl hydrazine, unsymmetrical dimethyl hydrazine, symmetrical dimethyl hydrazine, ethyl hydrazine; aldehydes including but not limited to methanal, ethanal, propanal and acrolein.

13. The process of claim 12 wherein the mechanical energy from said engine is utilized at least in part in the separation of said contaminants from said sweep gas obtained from said recovery well and said sweep gas is saturated with water by quenching said exhaust gas prior to injection and wherein said injecting is at a temperature in the range of 100° to 200° F. and at a pressure in the range 0.1 to 5 psig.

14. The process of claim 12 wherein the said engine is a diesel powered engine.

15. A method as in claim 1 wherein said internal combustion engine is a diesel engine.

16. In a process for the in situ removal of volatile contaminants from contaminated soil wherein a sweep gas is injected through an injection well into said contaminated soil and a volatile organic chemical containing sweep gas is removed from a recovery well, the improvement comprising utilizing as said sweep gas the exhaust obtained from an internal combustion engine.

17. A structure for the in situ removal of volatile contaminants from soil comprising:
    an internal combustion engine generating exhaust gas;
    means for injecting said exhaust gas into said contaminated soil; and
    means for removing a volatile organic chemical containing gas from said soil while said soil remains in situ.

18. A structure as in claim 17 which further comprises means for separating said volatile organic chemical from said volatile organic chemical gas and means for quenching said exhaust gas prior to injection into said contaminated soil and wherein said means for injecting is an injection well.

19. A structure as in claim 17 wherein said means for removing contaminated vapor is a recovery well.

20. A structure as in claim 17 wherein said means for removing contaminated vapor comprises exhaust gas passing upwardly through said soil.

* * * * *